J. H. PIERCE.
CORN HUSKER.
APPLICATION FILED SEPT. 18, 1905.
1,077,230.
Patented Oct. 28, 1913.
8 SHEETS—SHEET 5.
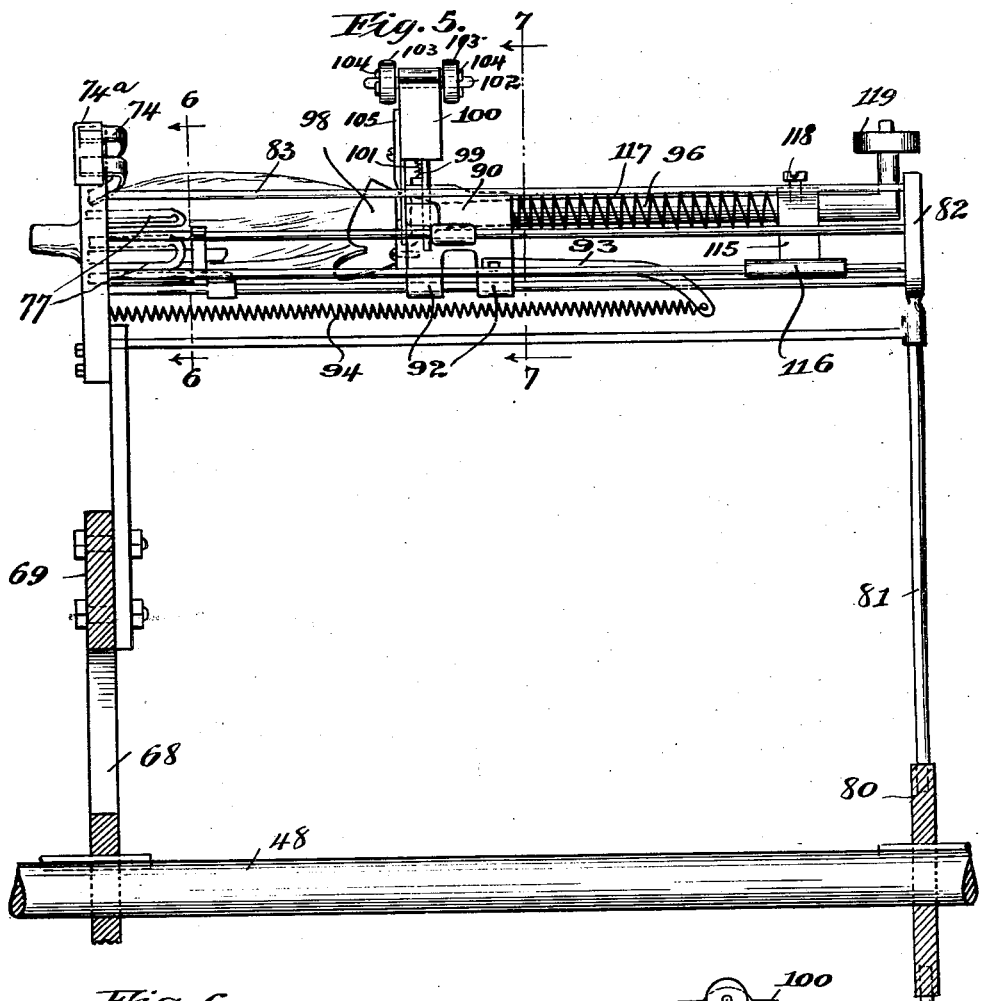
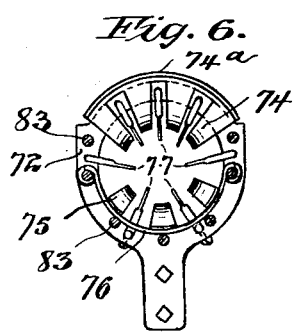
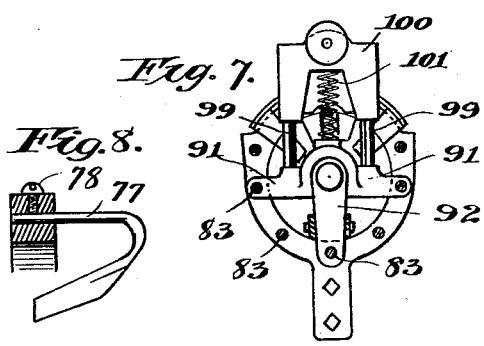
Witnesses,
Inventor,
Joseph H. Pierce
By Offield, Towle & Linthicum
Attys.

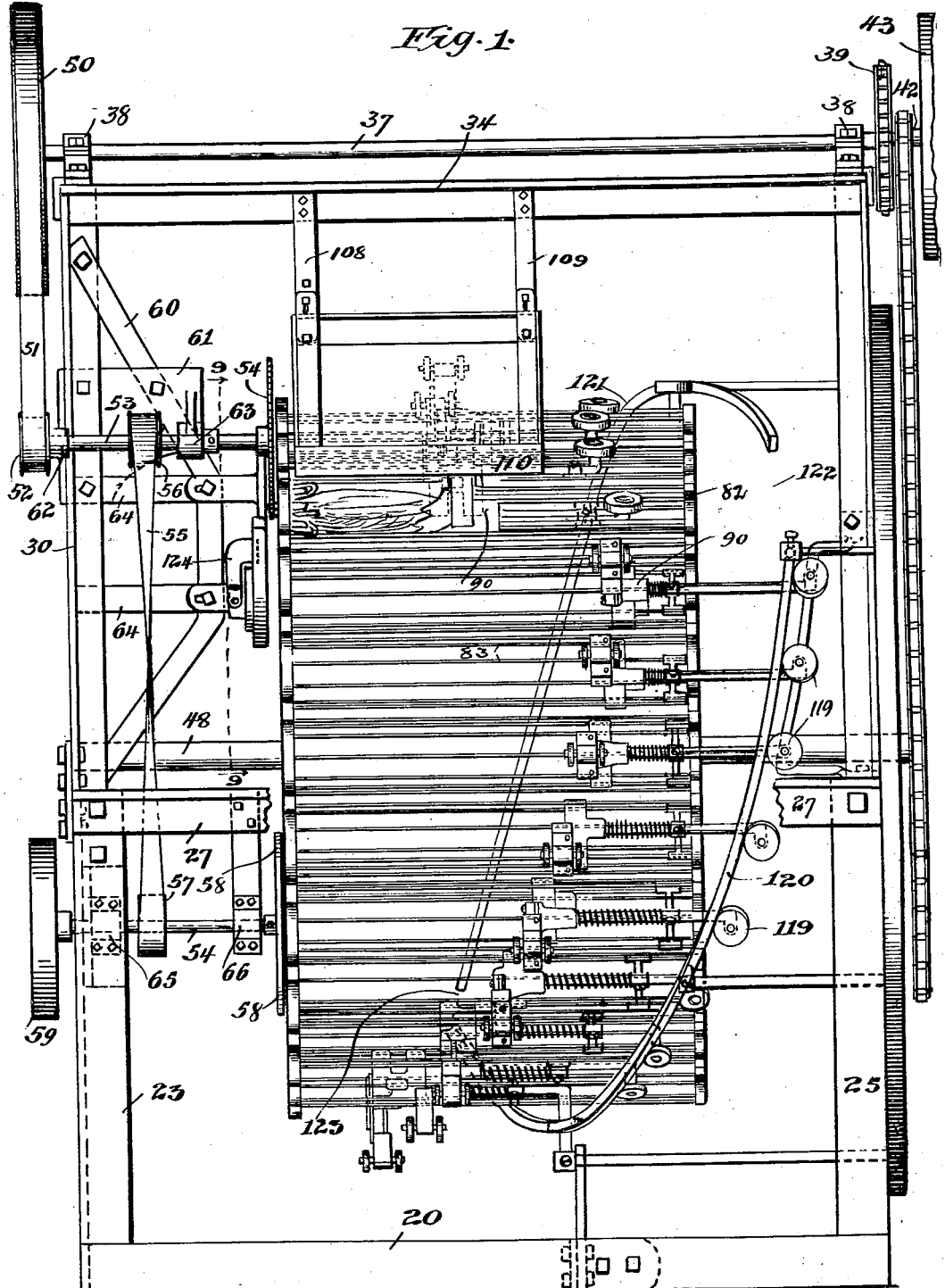

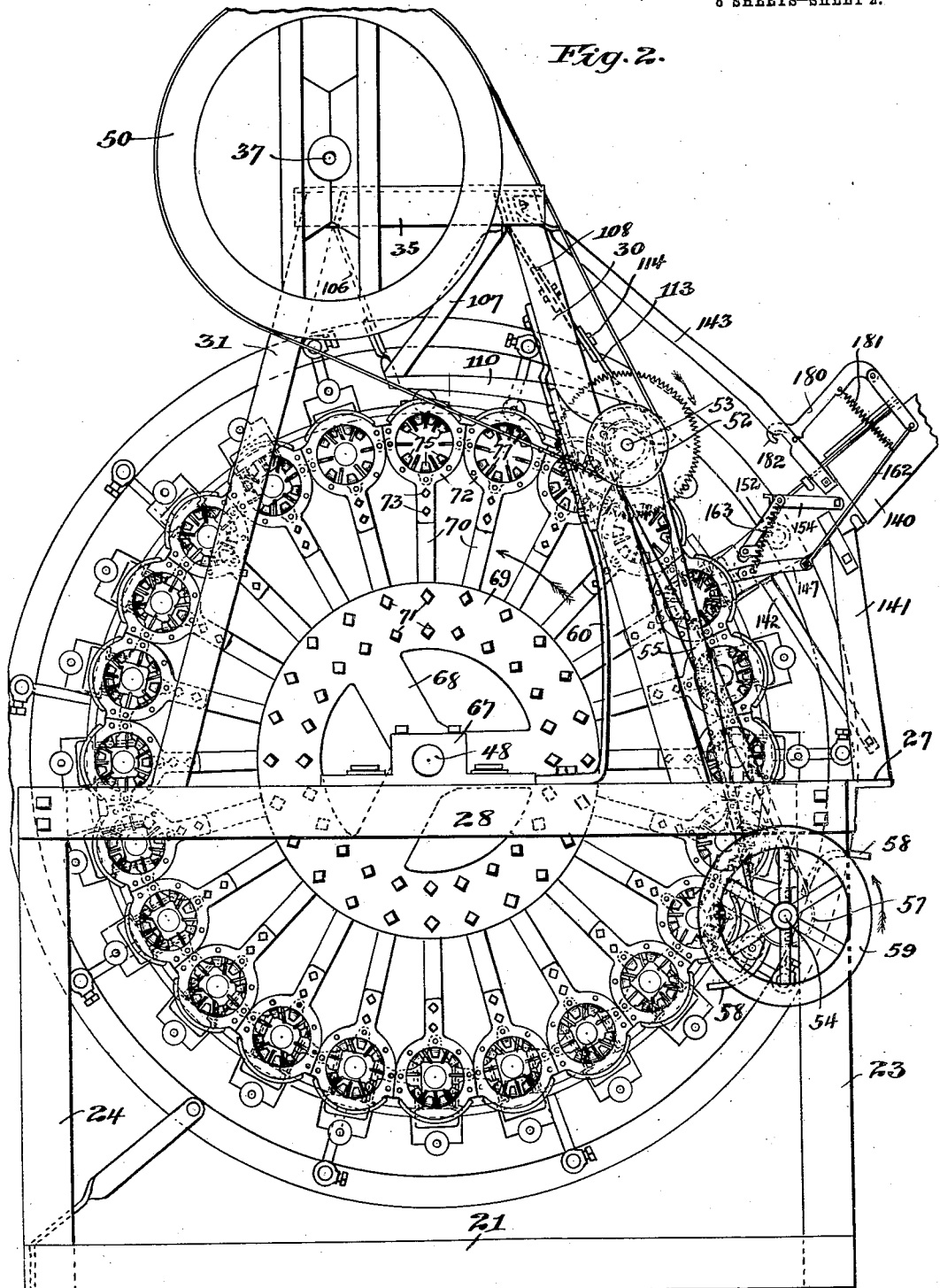

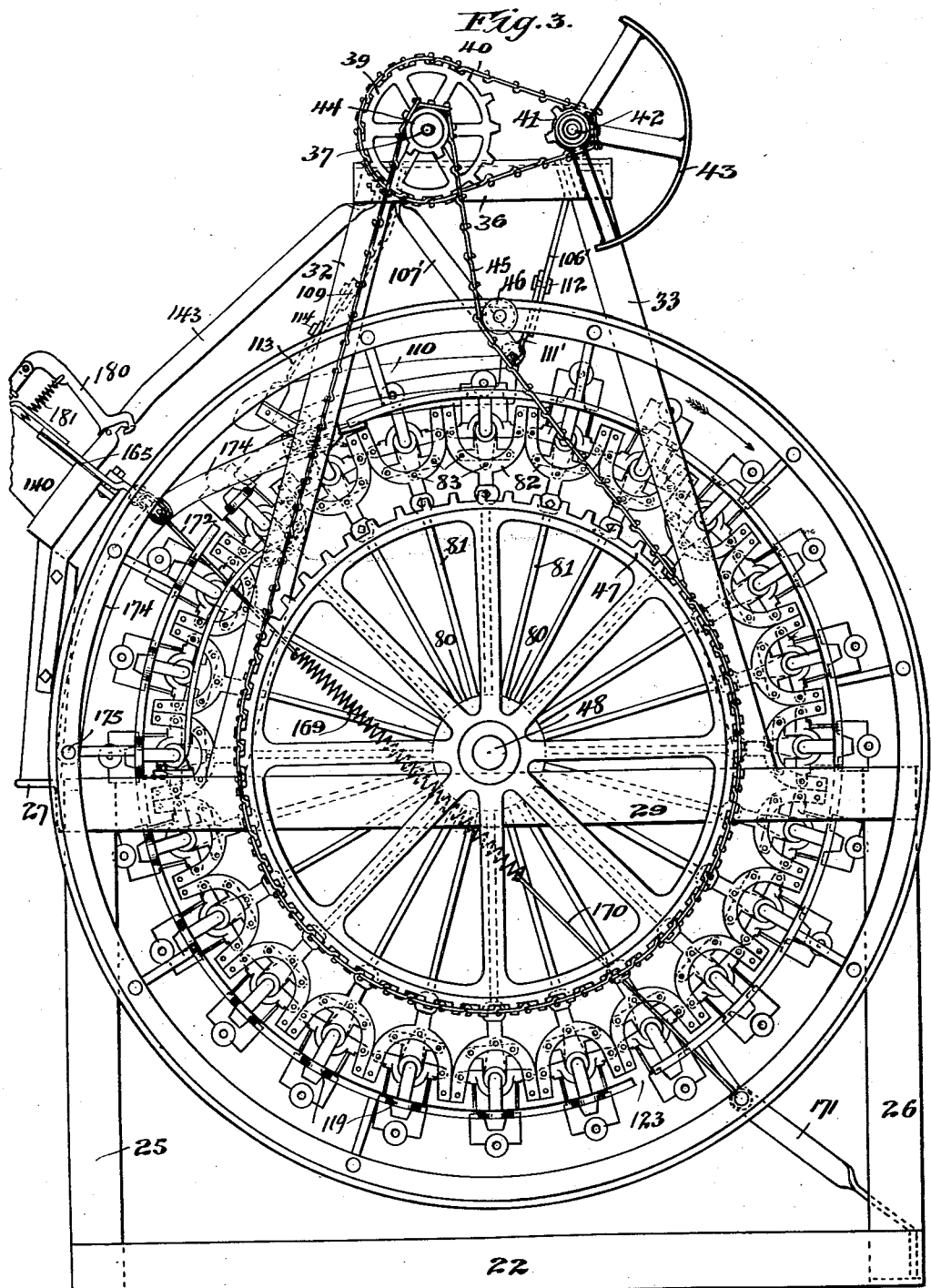

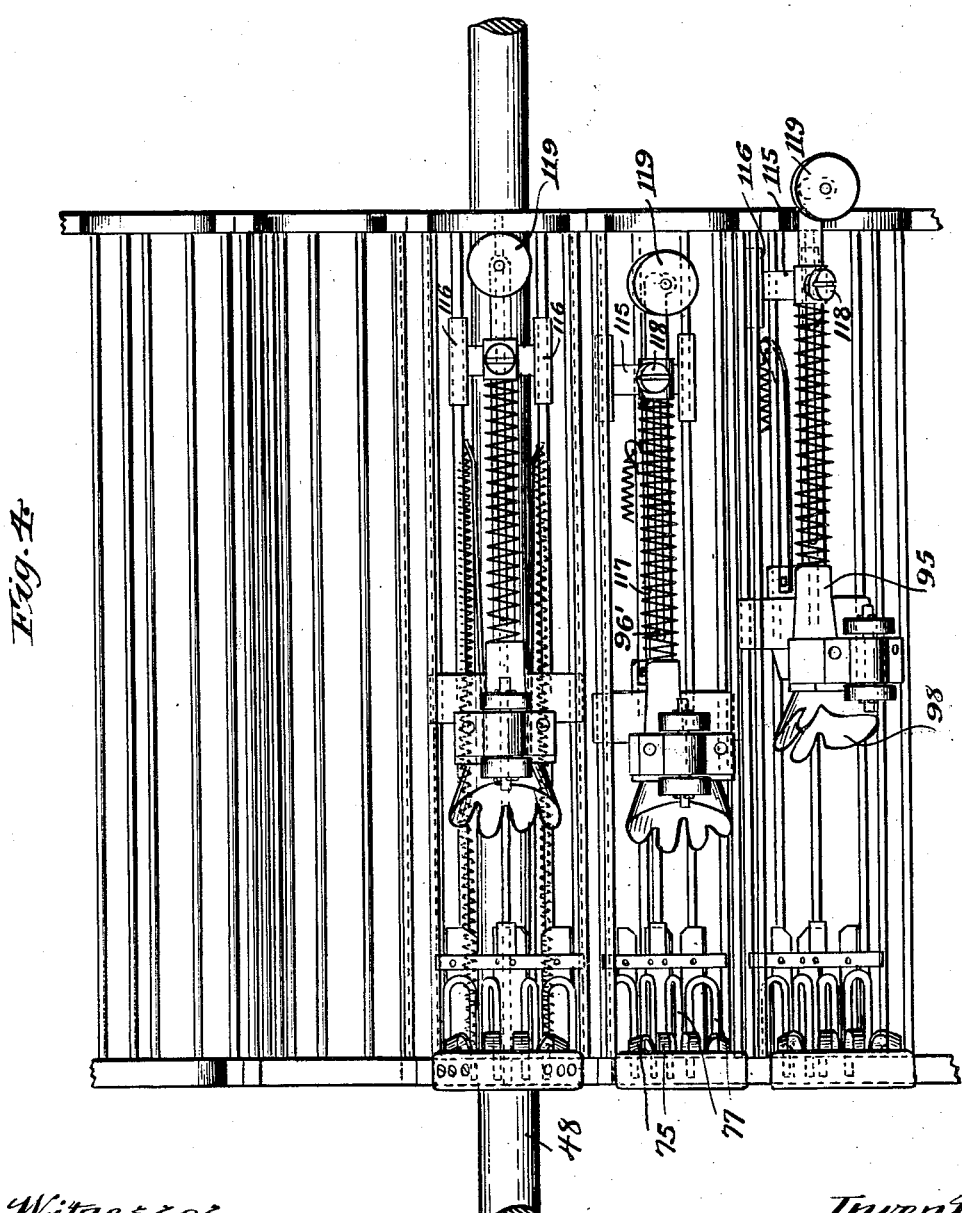

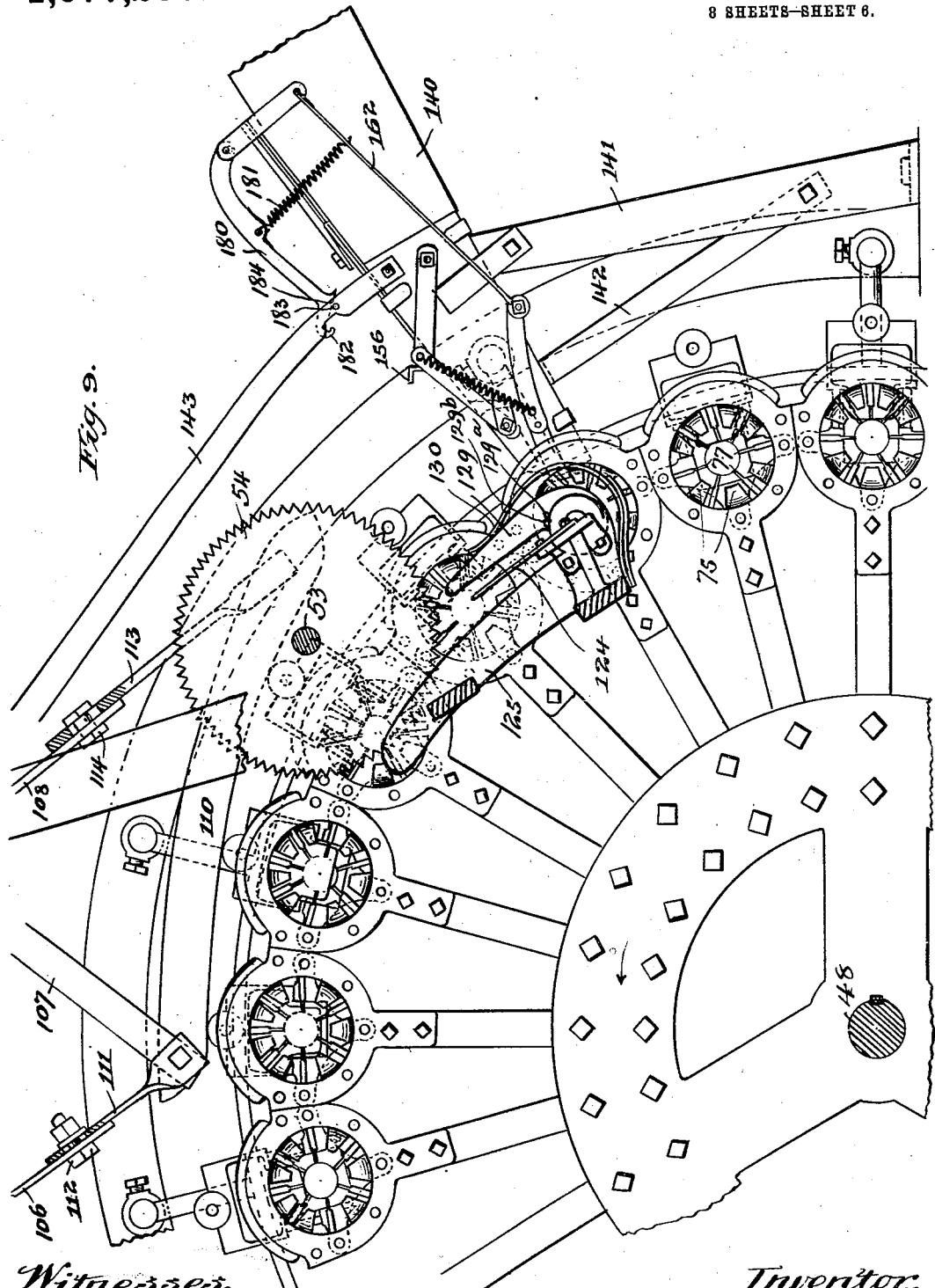

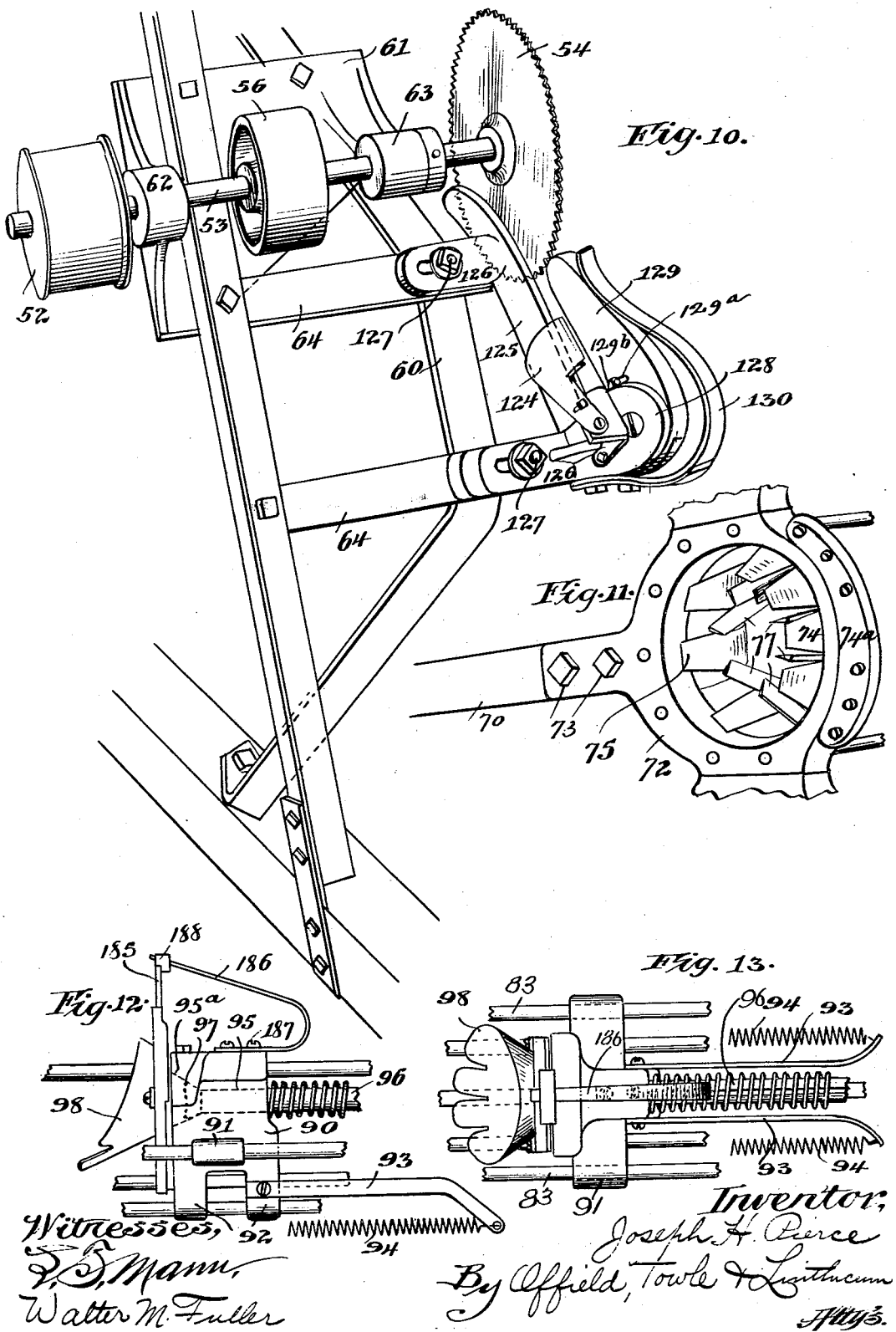

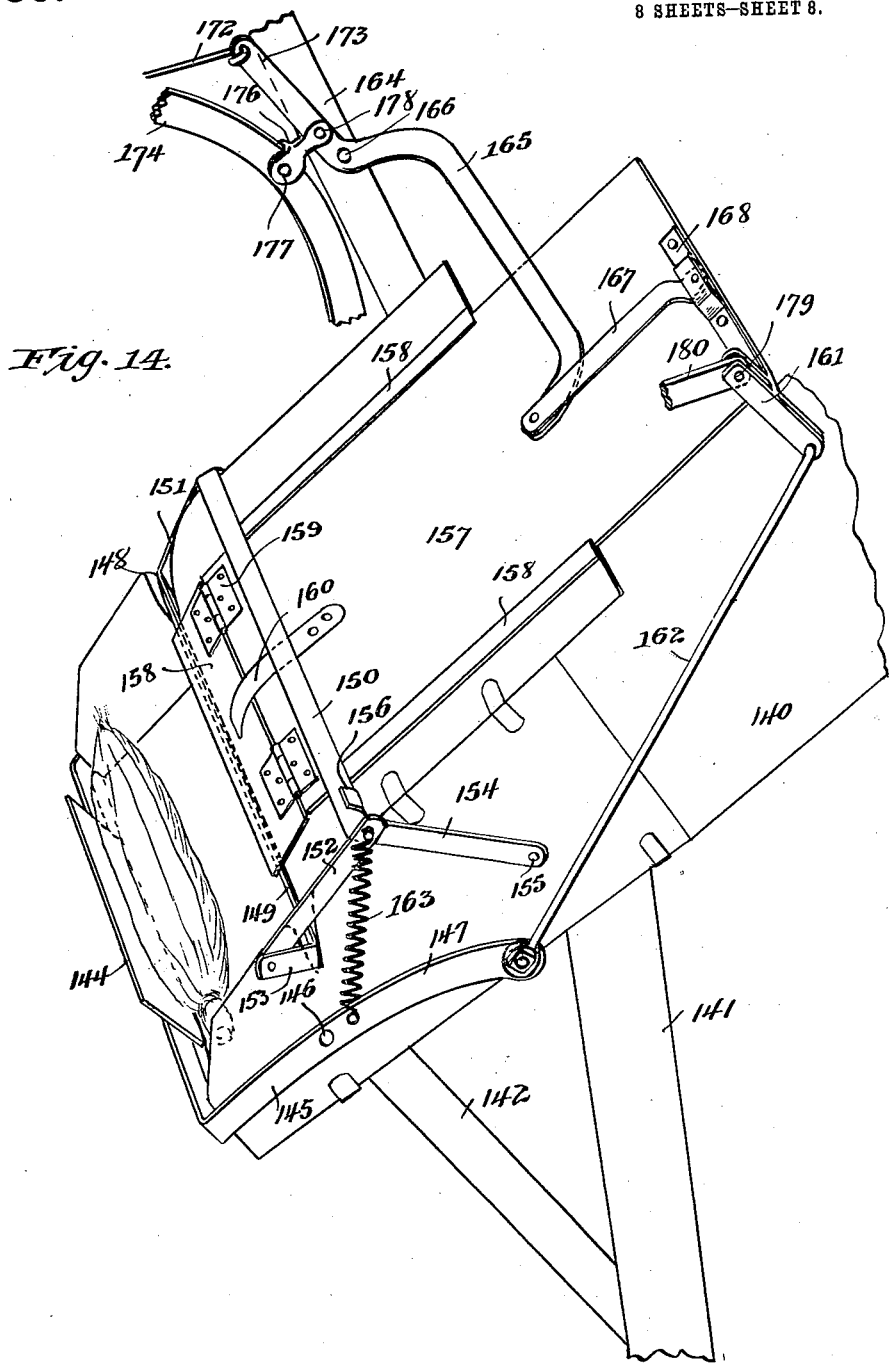

UNITED STATES PATENT OFFICE.

JOSEPH H. PIERCE, OF CHICAGO, ILLINOIS.

CORN-HUSKER.

1,077,230.    Specification of Letters Patent.    Patented Oct. 28, 1913.

Application filed September 18, 1905. Serial No. 278,969.

*To all whom it may concern:*

Be it known that I, JOSEPH H. PIERCE, a citizen of the United States, residing at Chicago, in the county of Cook and State of Illinois, have invented certain new and useful Improvements in Corn-Huskers, of which the following is a specification.

My invention relates to corn huskers in general, but is especially directed to machines of that character which are used to operate upon ears of green corn.

My novel and improved form of machine feeds ears of corn successively to a conveyer in which they are clamped in place and operated upon as follows: Each ear after being fed to the conveyer is thrust longitudinally against a stationary knife to split the protruding piece of stock up to the butt of the ear, this operation positioning the ear which is subsequently cut off at its base by a circular saw revolving adjacent to the conveyer thus removing the split pieces of stock and cutting through the husks. Another knife is provided for each ear which severs the top or silk end thereof, the knife being caused to cut by the operation of its rotating support engaging a fixed cam. The ear is then forced longitudinally between a plurality of converging spring knives so that its husks are shredded or slit their full length, and the ear is freed from the knives and falls from the machine. In order to remove any portion of the husks which have a tendency to cling to the knives or to become bunched about them, I provide a cleaner consisting of two rapidly revolving arms which rotate close to the knives and knock any remnants of husks therefrom.

In the accompanying drawings I have illustrated an embodiment of my invention, wherein:—

Figure 1 illustrates an elevation of my improved form of corn husker, a portion of the parts being broken away to more clearly show the structure; Fig. 2 is an elevation of the left hand end of the machine as illustrated in Fig. 1; Fig. 3 is an elevation of the right-hand end of the machine shown in Fig. 1; Fig. 4 is an enlarged plan view of a portion of the rotary drum or conveyer; Fig. 5 is a partial longitudinal section of the conveyer shown in Fig. 4; Fig. 6 is a cross-section on the line 6—6 of Fig. 5 looking in the direction of the arrows; Fig. 7 is a cross section on the line 7—7 of Fig. 5 looking in the direction of the arrows; Fig. 8 is an enlarged detail view of one of the shredding knives; Fig. 9 is an enlarged detail sectional view on the line 9—9 of Fig. 1 showing a portion of the conveyer, the saw, the stock splitting knife, and the feeding mechanism; Fig. 10 is a perspective view of the knife and saw and their operating mechanism for splitting and sawing off the stock ends of the ears of corn; Fig. 11 is an enlarged detail perspective view of the guides and knives for shredding or slitting the husks of the ear; Fig. 12 is a side elevation of a modified construction for supporting and severing the silk end of the ear; Fig. 13 is a plan view of the device shown in Fig. 12; and Fig. 14 is an enlarged perspective view of the feeding mechanism.

The frame of the machine comprises the front lower horizontal member 20, the end portions 21 and 22 and a back strip similar to the part 20; these parts as well as the remaining portions of the frame may be made of any convenient material such as wood or iron bars. Upright beams or bars 23, 24, 25, and 26 support the intermediate horizontal members 27, 28, and 29, while inclined bars or beams 30, 31, 32 and 33 are secured to the intermediate horizontal members and bear the weight of the upper horizontal bars 34, 35, and 36 and their attached parts.

Across the top of the machine frame is mounted shaft 37, rotating in bearings 38, the outer right-hand end of the shaft as shown in Fig. 1 being supplied with sprocket wheel 39 connected by sprocket chain 40 to a similar but smaller wheel 41 fastened to shaft 42 suitably supported on the frame. Also keyed to shaft 42 is driving pulley 43, which operates the entire mechanism of the machine. On this same end of shaft 37 is a smaller sprocket wheel 44 connected by chain 45 passing over the idler 46 with a comparatively large sprocket wheel 47 keyed to the outer end of the lower shaft 48 on which is mounted a rotary conveyer to be hereinafter described in detail. On the left-hand end of shaft 37, I provide pulley 50 to rotate pulley 52 my means of belt 51, jack-shaft 53 having pulley 52 at one end and at the other a circular saw 54 revolving in proximity to the rotary conveyer. Connecting shaft 53 with the lower shaft 54ª is a cross belt 55 passing over pulleys 56 and 57 on shafts 53 and 54ª respectively, the latter being supplied at its inner end with cleaner arms 58 to dislodge husks which may tend to accumulate about knives 77 described hereinafter. In order to make the rotation of these arms 58 more uniform, I mount a comparatively heavy balance wheel 59 on the outer end of shaft 54ᵃ as shown in Figs. 1 and 2. It will thus be observed that the motion of pulley 43 is transmitted by means of the various wheels, pulleys, sprocket chains, and belts, so that the conveyer, the saw, and the cleaner are rotated.

Shaft 53 may be supported on the main frame in any approved manner, for such purpose, however, I provide the bent bar 60 as shown in Figs. 1, 2, and 10 the same being bolted to the inclined supporting member 30 and to the horizontal bar or beams 28. Joining this bar 60 with the upright 30 is a plate 61 provided with bearings 62 and 63, in which is mounted shaft 53. Bar 60 is also connected to the inclined supporting member 30 by means of the additional bars 64 as shown in Figs. 1 and 10. Shaft 54ᵃ is supported in any approved manner the same rotating in bearings 65 and 66, bearing 65 being secured to the upright support 23, and bearing 66 depending from the horizontal frame member 27.

Shaft 48 revolves in bearings mounted on the intermediate horizontal end members of the frame, the left-hand bearing 67 being shown in Fig. 2. The conveyer which resembles to some extent a squirrel cage is fixed to shaft 48, and is constructed as follows: At its left-hand end spider 68 provided with ring 69 joining the outer ends of its three legs is supplied with a series of outwardly extended arms 70, fastened to ring 69 and bolts 71. To the outer end of each arm 70 is secured an annular member 72 by means of bolts 73 (Figs. 2, 5, 9, and 11). In order to guide the stalk end of the ear, I supply each one of annular members 72 with a series of circularly arranged converging spring arms 74 and 75, the four arms 74 being united by a strip 74ᵃ which is secured by means of screws or bolts to the upper outer side of ring 72, the three guide arms 75 being held together and in place by the integral strip 76 whose ends are wrapped around two of the rods 83 described below, as shown in Fig. 6. These guide arms project inwardly with respect to the conveyer from the ring 72 as shown in Figs. 4 and 5 and are then bent outwardly and converging, their outer ends passing into ring 72 (Fig. 11). Spaced between these guides is a plurality of spring knives 77 which are fitted in perforations in ring 72 and held therein by set-screws 78. These knives are of the shape illustrated in Fig. 8, their free ends being flattened and sharpened, and the knives are circularly arranged with their sharpened ends converging.

The right-hand end of the conveyer as viewed in Fig. 1 comprises a hub 80 keyed to the shaft 48, having a series of radially extended arms 81, to the outer end of each of which is secured a U-shaped member 82. These U-shaped members are in alinement with rings 72 at the opposite end of the conveyer, and uniting these two parts are the series of rods 83. It will now be seen that the members 72 and 82 with their connecting rods 83 form a series of pockets or receptacles, each of which is adapted to receive an ear of corn, the same being fed thereto by a feeding mechanism described hereinafter. Slidably mounted in each of these pockets or receptacles is a perforated supporting member 90 which reciprocates on three of the rods 83, the member 90 having outwardly and downwardly extended arms 91 and 92 for that purpose, each of which has a hole through which one of the rods 83 passes. Fastened to the lower portion of each support 90, are two arms 93, whose outer ends are connected to their corresponding ring 72 by tension spring 94. Each member 90 has a longitudinal perforation 95 with a tapered mouth 95ᵃ (Fig. 12) in which is rod 96, the inner end of each rod being supplied with a tapered head 97 fitting within the tapered mouth 95ᵃ of perforation 95. Each supporting member 90 on the side adjacent to its ring 72 is supplied with a funnel-shaped guiding and supporting member 98, which is intended to support the silk end of the ear of corn in the receptacle, a portion of the end protruding into the perforation 95. Each support 90 is also provided with two upstanding rods 99 (Figs. 5 and 7) on which reciprocates cutter member 100, the same being supplied with two perforations which slide on the rods 99. To hold the cutter 100 to the upper limit of its movement when not otherwise depressed is spring 101, inserted between said cutter member and the top portion of support 90 as shown in Fig. 7. To limit the upward movement of cutter 100 any form of stopping means may be employed. The upper end of member 100 is supplied with rod 102 which has two loose rollers 103, one at each side of the member 100 and held in place by cotter pin 104. To one face of member 100 is screwed knife blade 105, which when forced downwardly passes over the perforation 95, cutting off the silk end of the ear of corn which lies therein. Depending from the upper portion of the supporting frame of the machine and held thereto by iron bars 106, 106', 107, 107', 108, and 109 is cam 110 shown most clearly in Figs. 1, 2, and 9. Slotted bars 111 and 111' connect one end of the cam adjustably to the lower ends of depending bars 106 and 106', the adjustment being secured by clamping bars 111 and 111' in place by means of bolts 112. The other end of the cam is adjustably supported in a similar manner by slotted bars 113 and bolts 114. As the drum or conveyer rotates, the supporting and cutting member 90 passes under the cam 110, rollers 103 engaging the under surface thereof, and as the conveyer continues to rotate, the cam surface forces the rollers and the cutting blade 105 downwardly, so that the silk end of the ear is severed.

One end of each rod 96 is turned outwardly and has a roller 119 pivoted thereon, the rod passing through a perforation in a traveling member 115 slidably mounted by means of the projecting legs 116 on two or more of the rods 83. Each rod 96 has a longitudinal slot 96' with which a screw 118 threaded in the traveling member 115 engages to position the rod so that as the conveyer travels its roller 119 will properly co-act with the stationary cams 120 and 121, the screw preventing the rod from rotating in members 90 and 115. A compression spring 117 encircles each rod 96 and by pressing against members 90 and 115 maintains the latter in its extreme outward position permitted by the slot 96' and screw 118, thereby keeping rod 96 and its tapering head 97 at their limit of movement to the right as shown in Fig. 5. The stationary cams 120 and 121 which are supported by the frame in any approved manner are separated at their ends so as to leave the open spaces 122 and 123 between them. As the conveyer rotates, the rollers 119 traveling along the outer surface of cam 120 cause the traveling members 115 to reach the end of the conveyer and abut against the members 82, continued rotation of the conveyer, and movement of roller 119 on the cam compelling the compression of spring 117 and a further drawing of rod 96 and through its head 97 of member 90 to the right (Fig. 1), the parts reaching their limit of outward movement as the roller arrives at the space 122, at which time springs 94 are stretched and spring 117 is compressed to their greatest extent. As the conveyer continues to rotate, the rollers 119 pass through the space 122 under the action of springs 94 and 117 and then travel along the inner surface of cam 121, thereby pushing in rods 96 for a purpose which will be explained below.

Mounted adjacent to the rapidly revolving circular saw 54 is a stationary knife blade 124 and near its sharpened edge is an adjustable arm 125, supported on the iron bar 60 by means of slotted lugs 126, the same being held to bar 60 by bolts 127. Pivoted to the outwardly extended projection 128 of arm 125 is a lever 129, in the plane of arm 125 and spring pressed toward it by spring 130, pin 129ª on the lever limiting the movement of the lever by reason of its engagement with lug 129ᵇ on the projection 128.

The feeding mechanism for the machine which is shown in Figs. 2, 3, 9, and 14 comprises an inclined chute or box 140, supporting arms 141 and 142 extending upwardly, and arm 143 depending from the machine frame and fastened to the box or chute to sustain the same in place. Controlling the exit of the chute 140 is discharge plate 144, which is mounted on the frame 145 pivoted to the side of the chute at the point 146 and on the opposite side of the chute at a point in alinement with point 146, the frame having an extended arm 147, as shown most clearly in Fig. 14. This plate is adapted to lift and allow the discharge of an ear of corn by means of mechanism described hereinafter. Above the discharge plate 144, I provide a retarding member or plate 148 which extends transversely across the chute working in slots in the sides thereof and which controls the passage of the ears in the chute. Retarding member 148 comprises a frame consisting of two transverse portions 149 and 150 connected at one end by the strip 151, and at the other end a strip 152 rigidly connects the end of bar 150 to an upturned lug 153 integral with strip 149, the whole frame being supported on two arms 154 of which only one is shown in Fig. 14, the same being pivoted at point 155. Integral with or attached to strip 150, is catch 156. The feeding mechanism also comprises a slide plate 157 reciprocating in guides 158 on the upper surface of the box or chute, the slide having pivoted thereto at its lower end the feed plate 158 by means of hinges 159, spring 160 fastened to slide 157, operating on feed plate 158 to hold the same depressed. Attached to the upper end of the slide is member 161, which has pivoted thereto at its lower end rod 162 connecting it with the arm 147 which actuates discharge plate 144. Connecting arm 147 and the part 152 of the retarding frame is coiled spring 163, which tends to retain the retarding plate in position to prevent the passage of the ears in the chute. To the frame piece 164 is pivoted lever 165 at the point 166, one end of said lever being attached to the slide 157 by link 167, pivoted to the end of lever 165 and to the strip 168 fastened to the upper end of the slide. Spring 169 shown in Fig. 3 is connected at one end by rod 170 to the fixed portion 171 of the lower part of the frame, rod 172 connecting the upper end of said spring to the end 173 of lever 165. The operating lever 174 (Figs. 3 and 14) is pivoted to the frame of the machine at the point 175, and is pivoted to one end of the connecting piece 176 at the point 177, the other end of said piece 176 being pivoted at 178 to the lever 165 near its pivot 166. The free end of lever 174 which is pulled inwardly by means of spring 169 acting through the end 173 of lever 165 rides over the upper ends of the U-shaped members 82 as shown in Fig. 3. As the conveyer operates these upper ends of members 82 pass under the free end of lever 174 causing the same to move upwardly and when the ends have passed from beneath the lever the same move downwardly due to the action of spring 169. It will be obvious then that as the conveyer rotates lever 174 is constantly oscillating to a limited extent, and it is by means of this oscillation that the feeding mechanism of the device is operated. To the upper end of member 161 is pivoted at the point 179 a latch lever 180 shown in Figs. 2, 9, and 14, said lever being pulled downwardly by the spring 181 which joins it to the connecting rod 162. Latch lever 180 is provided at its end with a hook shaped portion 182, adapted to engage catch 156 on the retarding frame 148. Attached to the frame member 143 is a pin 183 over which rides the inclined cam portion 184 of the latch lever 180. As the slide 157 moves downwardly or advances, lever 180 rides over pin 183 at length engaging catch 156, and on the backward or reverse movement of slide 157, latch 182 remains engaged with catch 156 thereby raising the retarding plate or frame 148, allowing the passage of an ear of corn. When the slide has moved back to some extent, the cam portion 184 rides upon pin 183 whereupon the hook 182 is released from catch 156 so that the retarding member or plate assumes its original position under the influence of spring 163.

The operation of this machine is as follows: The driving of pulley 43, by means of an external source of power rotates shaft 42, and by means of the sprocket wheels 39 and 41 together with the connecting chain 40, shaft 37 receives its rotary motion. Shaft 48 which bears the conveyer receives its motion from shaft 37, by means of the sprocket wheels 44 and 47 and the connecting chain 45, the slack of which is taken up by means of the adjustable idler 46. Shaft 37 transmits power to shaft 53 by means of pulleys 50 and 52 and belt 51, these connections furnishing rapid motion for the circular saw 54ª, and in order to rotate shaft 54ª with its cleaning arms 58, the crossed belt 55 is passed over the pulleys 56 and 57, balance wheel 59 producing a uniform motion of parts. The chute 140 having been supplied with the ears of corn with their stock ends all at one side, the feeding mechanism is operated in this manner: The rotation of the conveyer causes the oscillation of lever 174 whose outer end rides over and is released from the upper ends of U-shaped members 82. This oscillating motion of lever 174 is communicated by means of connecting piece 176 to lever 165, the latter causing the reciprocation of slide 157. The advance of downward movement of slide 157 lifts discharge plate 144 by means of connecting parts 161, 162, 147, and 145. As the slide still further advances, the pivoted spring pressed feed plate 158 strikes the ear, if it has not been already discharged into its receptacle by the lifting of plate 144, and forces the same into said receptacle, the movement of the parts being so timed that the receptacle will be opposite the discharge end of the feeding mechanism at the instant the ear is released and pushed therefrom. During this forward or advance movement of the slide, the latch lever 180 engages catch 156, and on the backward or reverse movement of the slide, the discharge plate is lowered so as to close the exit of the chute, the retarding plate or frame 148 is lifted by means of the movement of the latch and catch so as to allow an ear to roll down the chute against the discharge plate to replace the one which has just been discharged into its receptacle. As the slide still continues on its backward movement, latch lever 180 riding over its coöperating pin 183 and held there against by spring 181, at length reaches the position where the cam surface 184 comes in contact with pin 183, thereby lifting the latch lever so that its hook end 182 is freed from catch 156, whereupon the retarding plate or frame 148 quickly returns to its normal position under the influence of spring 163. On the next forward movement of the slide the ear which has just been described as rolling down the chute to the discharge plate, would be forced into the next receptacle. At the time the ear is placed in its receptacle, the supporting and cutting member 90 is at its extreme limit of movement to the right as shown in Fig. 1, being held in that position by means of roller 119 engaging the outer side of cam 120. As soon as the ear is deposited in the receptacle or trough roller 119 passes off of the end of cam 120, and due to the release of the tensioned springs 94 and compressed spring 117 the members 90, 96 and 115 quickly slide to the left, the silk end of the corn passing into the funnel shaped member 98 and protruding into the tapering mouth 95ª of member 90. The sliding movement of member 90 under the action of springs 94 and 117 causes the stock end of the ear to project from the end of the conveyer, the same being forced against knife blade 124, the butt end of the ear striking on arms 125 and 129. By this operation the stock end is split up to the cob by blade 124, thus positioning the ear so that the rapidly rotating circular saw 54 will sever the stock and husks at the cob as the conveyer revolves, the stalk end easily passing out from between the arms 125 and 129 due to the fact that arm 129 is pivoted and spring pressed. As the conveyer or drum travels around, the rollers 103 on the cutting member 100 are pressed radially inward by coming in contact with the cam surface 110, knife blade 105 thereby severing the silk end of the ear. Continued rotation of the conveyer causes the rollers 103 to pass from under the cam the cutting blade 105 being raised by means of spring 101 which was compressed in the downward movement of cutter 100. The rotation of the conveyer causes each roller 119 to engage the inner surface of stationary cam 121, the point at which this engagement takes place depending upon the position of said roller which is determined by the length of the ear in the receptacle. As the roller travels on the cam 121 rod 96 and traveling member 115 are moved inwardly, causing the compression of spring 117, and also forcing the ear outwardly by means of the end 97 of rod 96 engaging the inner end of the ear, the ear being guided by the members 74 and 75 and pressed between knives 77, so that as the ear passes through the ring 72 its husks are shredded or slit their entire length, and the ear is discharged from the machine. The continued rotation of the conveyer, brings the husks which have accumulated about the knives and guides into contact with the rapidly revolving cleaner arms 58, thereby removing the husks from the machine. When the roller reaches the space 123 it is pressed to the right by the expansion of spring 117 so as to engage and travel on the outside of cam 120 as the conveyer continues its rotation. Each ear in each receptacle is treated in the manner described above, and since the feeding mechanism is constantly supplying ears to the empty receptacles, the operation of husking the corn is continuous.

Instead of the mechanism for severing the silk end of the ear described above, I may use the form shown in Figs. 12 and 13. The knife blade 185 is mounted on the outer end of spring 186 which is fastened at its inner end to the member 90 by means of screws 187. The portion 188 may be integral with the knife blade or it may be a separate member attached to the knife blade, spring 186 taking the place of the rollers 103 described above. As the members 188 pass under the cam 110, the blades 185 are caused to shear off the ends of the ears as will be apparent.

While I have herein shown and described what I deem preferred embodiments of the invention, I am aware that modifications can be made therein without departing from the substance of my invention and I do not, therefore, limit the invention to the details shown and described except in so far as such details are made the subject matter of specific claims.

I claim:

1. In a device for positioning and severing ears of corn, the combination of a knife, yielding means for moving the ear of corn longitudinally stock-end foremost against the edge of said knife with sufficient force to split the stock up to the butt of the ear only, the knife acting as an abutment to limit the movement of the ear, and means acting after the ear has been thus positioned to cut off said split stock at its junction with the cob, substantially as described.

2. In a device for positioning and severing ears of corn, the combination of a stationary knife, a movable conveyer for an ear of corn, yielding means for moving the ear of corn in said conveyer longitudinally stock-end foremost against the edge of said knife with sufficient force to split the stock up to the butt of the ear only, the knife acting as an abutment to limit the movement of the ear, and means acting after the ear has been thus positioned to cut off said split stock at its junction with the cob, substantially as described.

3. In a device for positioning and severing ears of corn, the combination of a knife, yielding means for moving the ear of corn longitudinally stock-end foremost against the edge of the knife with sufficient force to split the stock up to the butt of the ear only, said knife acting as an abutment to aid in limiting the movement of the ear, additional means to limit the movement of the ear, and means acting after the ear has been thus positioned to cut off the said split stock at its junction with the cob, substantially as described.

4. In a machine of the character described, the combination of a stationary arm, a pivoted arm adjacent to said stationary arm, a support for an ear of corn, and means to move said ear of corn against said arms to position the same, the butt of the ear striking said arms, substantially as described.

5. In a machine of the character described, the combination of a knife, a stationary arm and a pivoted arm in the plane of said stationary arm, adjacent to said knife, a support for an ear of corn, and means for moving said ear longitudinally against said knife and arms so that the knife splits the stock end of said ear and the same is positioned, substantially as described.

6. In a machine of the character described, the combination of a knife, a stationary arm and a spring pressed pivoted arm in the plane of said stationary arm, both arms being adjacent to said knife, a support for an ear of corn, and spring actuated means for moving said ear longitudinally against said knife and arms, so that the knife splits the stock end of the ear and positions the same, substantially as described.

7. In a machine of the character described, the combination of a conveyer having a plurality of receptacles each adapted to contain an ear of corn, a stationary knife, and means to push each ear of corn longitudinally stock end foremost against the edge of said knife with sufficient force to split its stock end up to the butt of the ear only, thereby positioning the ear for the subsequent removal of its stock end, substantially as described.

8. In a machine of the character described, the combination of a conveyer having a plurality of receptacles each adapted to receive an ear of corn, a stationary knife, a stationary and a pivoted arm adjacent to said knife, and means to move each ear of corn against said knife and arms to split the stock end thereof and position the ear, substantially as described.

9. In a machine of the character described, the combination of a rotary receptacle for an ear of corn, means for moving said ear lengthwise said receptacle, and a series of knives in said receptacle converging in the direction of movement of said ear, whereby said ear is forced between said knives and its husks slit longitudinally thereby, substantially as described.

10. In a machine of the character described, the combination of a rotary receptacle for an ear of corn, a series of circularly arranged converging spring knives at one end of said receptacle, and means for forcing said ear between said knives so as to slit its husks, substantially as described.

11. In a machine of the character described, the combination of a rotary receptacle for an ear of corn, a series of converging knives at one end of said receptacle, a series of guides adjacent to said knives, and means for forcing said ear between said guides and knives so as to slit its husks, substantially as described.

12. In a machine of the character described, the combination of a rotary receptacle for an ear of corn, a series of converging knives at one end of said receptacle, and a member slidable in said receptacle to force said ear between said knives so as to slit its husks, said knives being stationary relative to said member, substantially as described.

13. In a machine of the character described, the combination of a movable receptacle for an ear of corn, cutting means in said receptacle, a member movable in said receptacle to force the ear against said cutting means so as to slit its husks, and cam operated means to actuate said member, substantially as described.

14. In a machine of the character described, the combination of a conveyer provided with a receptacle for an ear of corn, a series of knives mounted on said conveyer and at one end of said receptacle, and means for forcing said ear between said knives so as to slit its husks, substantially as described.

15. In a machine of the character described, the combination of a conveyer provided with a plurality of receptacles, each adapted to receive an ear of corn, a series of knives for each receptacle, and means for forcing said ears between said knives so as to slit their husks, substantially as described.

16. In a machine of the character described, the combination of a conveyer provided with a plurality of receptacles, each adapted to receive an ear of corn, a series of knives a one end of each receptacle, means in each receptacle for forcing its ear between said knives so as to slit its husks, and a cam to operate said means, substantially as described.

17. In a machine of the character described, the combination of a rotary conveyer provided with a plurality of receptacles, each adapted to receive an ear of corn, a series of knives at one end of each receptacle, means in each receptacle to force its ear between said knives so as to slit its husks, and a stationary cam to coöperate with said means to operate them as the conveyer rotates, substantially as described.

18. In a machine of the character described, the combination of a conveyer provided with a plurality of receptacles each adapted to receive an ear of corn, a feeding mechanism for supplying ears to said receptacles, means to split the stock end of each ear to position the same, means to sever the stock end of each ear, means to sever the silk end of each ear, means to slit the husks of each ear, and means to remove the ear from the machine, substantially as described.

19. In a machine of the character described, the combination of a conveyer provided with a plurality of receptacles each adapted to receive an ear of corn, a feeding mechanism to supply ears to said receptacles, means to split the stock end of each ear to position the same, means to sever the stock end of each ear, means to sever the silk end of each ear, means to slit the husks of each ear, means to remove each ear from the machine, and a cleaning mechanism to remove the husks from the machine, substantially as described.

20. In a machine of the character described, the combination of a series of knives to slit the husks of an ear of corn, and revolving cleaning arms rotating adjacent to said knives to dislodge husks accumulated about said knives, substantially as described.

21. In a machine of the character described, the combination of a series of converging knives to slit the husks of an ear of corn, a series of converging guides to direct the ear of corn to said knives, and revolving cleaning arms rotating adjacent to said knives and guides to dislodge husks accumulated about said knives, substantially as described.

Chicago, Ill., Sept. 13, A. D. 1905.

JOSEPH H. PIERCE.

Witnesses:
 WALTER M. FULLER,
 FREDERICK C. GOODWIN.